United States Patent [19]
Guerci et al.

[11] Patent Number: 5,121,125
[45] Date of Patent: Jun. 9, 1992

[54] OPTIMUM MATCHED ILLUMINATION WAVEFORM DESIGN PROCESS

[75] Inventors: Joseph R. Guerci, Astoria; Philip G. Grieve, New York, both of N.Y.

[73] Assignee: Grumman Aerospace Corporation, Bethpage, N.Y.

[21] Appl. No.: 643,140

[22] Filed: Jan. 18, 1991

[51] Int. Cl.$^5$ .............................. G01S 13/28
[52] U.S. Cl. .................... 342/204; 342/192
[58] Field of Search ............ 342/82, 83, 204, 192

[56] References Cited

U.S. PATENT DOCUMENTS 3,614,719 10/1971 Treacy ........................... 342/83
4,901,082 2/1990 Schreiber et al. .......... 342/192 X
4,992,797 2/1991 Gjessing et al. ............. 342/192

FOREIGN PATENT DOCUMENTS 57-79475 5/1982 Japan .................... 342/82

*Primary Examiner*—Gilberto Barrón, Jr.
*Attorney, Agent, or Firm*—Bacon & Thomas

[57] ABSTRACT

An optimized theoretical approach to the design of a waveform for a matched illumination-reception radar system incorporates radar cross section codes along with detailed target geometry and system constrains to maximize the signal energy of a received echo. An Eigensystem is used to generate a family of solutions, one of which is chosen based upon system constraints to optimize the waveform.

5 Claims, 1 Drawing Sheet

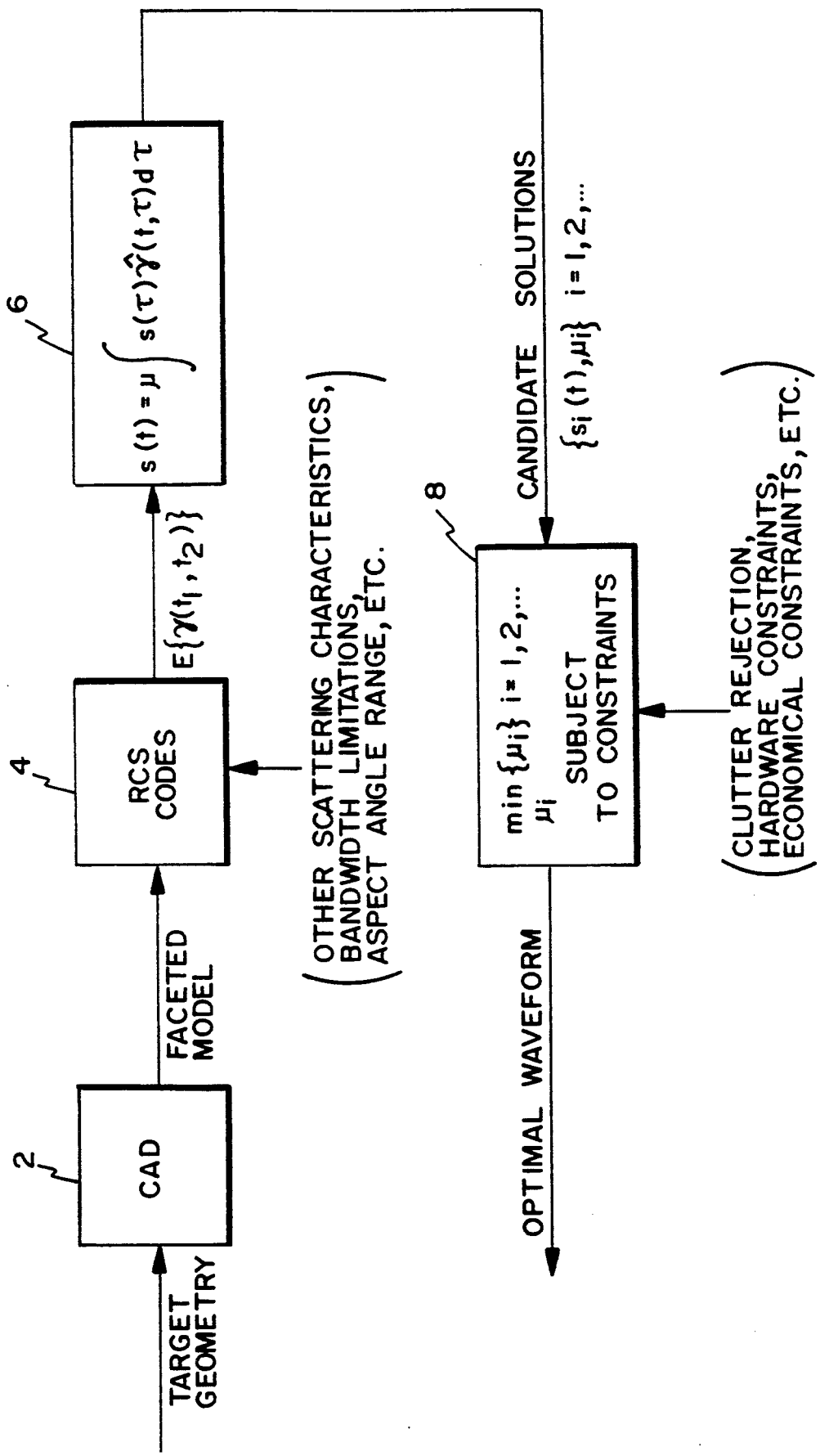

OPTIMUM MATCHED ILLUMINATION WAVEFORM DESIGN PROCESS

BACKGROUND OF THE INVENTION

1. Field of the Invention

The present invention relates generally to radar detection of targets, and more particularly, to the design of a waveform s(t) to be transmitted to the target such that the radar receiver's output (response to the target's echo) signal-to-noise ratio (SNR) is maximized.

2. Description of the Related Art

The state of the art of detecting low observable aircraft or other targets using radar has not advanced as quickly as the crafts themselves and their ability to evade detection. Detection to date has been limited in the type and character of modulation that could be applied to a transmitted signal. For example, the transmitters were incapable of applying arbitrary amplitude and phase modulation. With the advent of linear amplifiers and other transmitter improvements, however, arbitrary amplitude and phase modulation is now possible.

Even with new linear amplifier technology, a fundamental difficulty exists in the design of a matched illumination-reception (OMIR) radar. This difficulty is the design of an illumination waveform, or transmitted pulse, that is optimized to result in the maximum SNR for the received echo signal. In order to optimize the illumination waveform, detailed scattering characteristics of the target, as well as other characteristics such as system bandwidth, must be incorporated into the waveform design process.

SUMMARY OF THE INVENTION

The present invention addresses these concerns by combining an optimal theoretical approach to maximizing the amount of energy present in the reflected radar echo with state-of-the-art computer-generated radar cross-section (RCS) codes.

First, a computer-aided design (CAD) system models the target based upon known geometrical data of the target. Second, appropriate RCS codes incorporating such parameters as additional scattering characteristics (e.g., polarization), bandwidth limitations, expected aspect angle variation, and inhomogeneous radar-absorbing coatings are applied to the model to develop an expected (in the probabilistic sense) autocorrelation function $E\{\gamma(t,\tau)\}$ for the impulse response h(t) of the target, where $$E\{\gamma(t,\tau)\} = \int_{T_i}^{T_f} E\{h(\lambda - t)h^*(\lambda - \tau)\}d\lambda$$

and where the observation time interval $T_i \to T_f$ is arbitrary. Finally, solutions s(t)—the transmitted pulse—to the eigensystem equation $$s(t) = \mu \int_0^T s(\tau)E\{\gamma(t,\tau)\}d\tau$$

are generated, where T is the pulse duration, and the solution that maximizes the echo energy while satisfying other system constraints is chosen.

BRIEF DESCRIPTION OF THE DRAWING

The lone FIGURE illustrates the inventive optimum matched illuminationreception (OMIR) radar waveform design process.

DETAILED DESCRIPTION OF THE PREFERRED EMBODIMENTS

With reference to the Figure, the geometry of the aircraft or other target to be detected is first modeled at 2. Preferably, a computer-aided design (CAD) system utilizes detailed information derived, in general, from intelligence reports or other sources to generate the faceted model. Radar cross-section (RCS) prediction codes are then applied to the model at 4 along with other additional scattering characteristics (e.g., polarization), bandwidth limitations, expected aspect angle variation, and inhomogeneous radar-absorbing coatings, for example, to determine the expected value (in the probabilistic sense) of the autocorrelation function $E\{\gamma(t,\tau)\}$ for the impulse response h(t) of the target, where $$E\{\gamma(t,\tau)\} = \int_{T_i}^{T_f} E\{h(\lambda - t)h^*(\lambda - \tau)\}d\lambda$$

and where the observation time interval $T_i \to T_f$ is arbitrary.

The impulse response is a complex (amplitude and phase) function representing the reflectivity of the target. If the aspect angle $\theta$ is known, then $\gamma$ is a known function. Alternatively, if $\theta$ is unknown, then the expected value of $\gamma$ (in the probabilistic sense), denoted by $E\{\gamma\}$, is used in place of $\gamma$.

The expected value of $\gamma$, $E\{\gamma\}$, is then inserted into the Eigensystem $$s(t) = \mu \int_0^T s(\tau)E\{\gamma(t,\tau)\}d\tau$$

at 6, where T is the (arbitrary) pulse duration. One skilled in the art will recognize that this is a homogeneous Fredholm integral equation with a Hermitian kernel and, therefore, has a countably infinite number of solutions (eigenfunctions/eigenvalues).

Ideally, the eigenfunction associated with the minimum eigenvalue $\mu$ would be chosen since this maximizes the energy in the echo. However, depending on additional system constraints (e.g., range resolution, clutter rejection, hardware constraints, and economic considerations), a solution (eigenfunction) corresponding to a non-minimum $\mu$ might be more suitable from an overall systems optimization perspective.

Various modifications to the invention will become obvious to those skilled in the art. All such modifications that basically rely on the teachings through which the invention has advanced the state of the art are properly considered within the spirit and scope of the invention.

We claim:

1. A method for designing a matched illumination radar waveform for use in a radar system, comprising the steps of:
    (a) selecting a target;
    (b) generating a geometrical model of the target;

(c) predicting an impulse response of the target for a transmitted matched illumination radar waveform;

(d) deriving from the impulse response an autocorrelation function for the target in order to predict the echo energy of the transmitted matched illumination radar waveform upon interaction with the target;

(e) deriving a set of solutions to an Eigensystem equation for the autocorrelation function;

(f) testing the solution to obtain a subset of solutions which satisfies constraints on generation of waveforms by said radar system; and (g) choosing a solution from said subset of solutions which has a minimum Eigenvalue, the resulting chosen solution thereby having a maximum echo energy and minimum signal-to-noise ratio for the selected target, while still satisfying said system constraints.

2. A method as claimed in claim 1, wherein step (c) comprises the step of applying radar cross-section prediction codes to the geometrical model of the target to predict the impulse response of the target.

3. A method as claimed in claim 2, wherein step (c) further comprises the step of incorporating into the prediction of the autocorrelation function additional factors including polarization of a waveform by the target, bandwidth limitations of the system, expected angle variations of the target during an observation time interval, and the presence in the target of inhomogeneous radar-absorbing coatings.

4. A method as claimed in claim 3, further comprising the step of collecting intelligence data in order to obtain geometrical data and data on said additional factors for the selected target.

5. A method as claimed in claim 1, wherein step (f) comprises the step of specifying system constraints including range resolution, clutter rejection, and economic considerations, and determining which of the waveforms given by the Eigensystem solutions can be generated within the specified constraints.

* * * * *